United States Patent
Charzinski et al.

(10) Patent No.: US 7,987,288 B2
(45) Date of Patent: Jul. 26, 2011

(54) METHOD AND ARRANGEMENT FOR ROUTING DATA PACKETS IN A PACKET-SWITCHING DATA NETWORK

(75) Inventors: Joachim Charzinski, München (DE); Karl Schrodi, Geretsried (DE); Gert Willmann, Stuttgart (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 281 days.

(21) Appl. No.: 10/542,116

(22) PCT Filed: Mar. 19, 2003

(86) PCT No.: PCT/DE03/00912
§ 371 (c)(1),
(2), (4) Date: Jul. 12, 2005

(87) PCT Pub. No.: WO2004/071028
PCT Pub. Date: Aug. 19, 2004

(65) Prior Publication Data
US 2006/0168317 A1    Jul. 27, 2006

(30) Foreign Application Priority Data
Jan. 15, 2003 (DE) .................. 103 01 265

(51) Int. Cl.
*G06F 15/173* (2006.01)

(52) U.S. Cl. ......... 709/241; 709/239; 370/218; 370/236

(58) Field of Classification Search .............. 709/239, 709/241; 370/218, 236
See application file for complete search history.

(56) References Cited

U.S. PATENT DOCUMENTS

| | | | | |
|---|---|---|---|---|
| 5,596,722 A * | 1/1997 | Rahnema | ............... | 709/241 |
| 6,141,319 A * | 10/2000 | Dighe et al. | ............... | 370/218 |
| 6,542,934 B1 * | 4/2003 | Bader et al. | ............... | 709/239 |
| 2003/0202476 A1 * | 10/2003 | Billhartz et al. | ............... | 370/236 |
| 2003/0223358 A1 * | 12/2003 | Rigby et al. | ............... | 370/218 |
| 2006/0168317 A1 * | 7/2006 | Charzinski et al. | ............... | 709/238 |

FOREIGN PATENT DOCUMENTS
EP    1 261 178 A2    11/2002

* cited by examiner

*Primary Examiner* — Thu Ha T Nguyen
(74) *Attorney, Agent, or Firm* — Laurence A. Greenberg; Werner H. Stemer; Ralph E. Locher

(57) ABSTRACT

The invention relates to the routing of data packets comprising a target address in a packet switching data network. According to the invention, a first and second transmission path are assigned respective traffic distribution weightings in a routing table for individual target addresses that is assigned to a network node, said weightings indicating the respective allocated traffic load per transmission path. The maximum traffic distribution weighting is assigned to the respective first transmission path and the minimum traffic distribution weighting is assigned to the second transmission path. During undisturbed operation, data packets are routed via the first transmission path and if said path is interrupted, the packets are routed via the second transmission path.

20 Claims, 3 Drawing Sheets

METHOD AND ARRANGEMENT FOR ROUTING DATA PACKETS IN A PACKET-SWITCHING DATA NETWORK

CROSS REFERENCE TO RELATED APPLICATIONS

This application is the US National Stage of International Application No. PCT/DE2003/000912, filed Mar. 19, 2003 and claims the benefit thereof. The International Application claims the benefits of German application No. 10301265.6 filed Jan. 15, 2003, both applications are incorporated by reference herein in their entirety.

FIELD OF THE INVENTION

The invention relates to a method and system for routing data packets in a packet-switching data network.

SUMMARY OF THE INVENTION

Various methods are used for routing or for alternate routing or for transmitting data packets with a destination address such as, for example, Internet Protocol packets, IP packets for short, or Protocol Data Units, PDUs for short, from a transmitter to a receiver in a packet-switching data network such as, for example, Internet Protocol networks, IP networks for short, or Open System Interconnect networks, OSI networks for short, having multiple network nodes such as, for example, routers, switches or gateways. The routing determines on which path the data packets go from the transmitter to the receiver.

Known routing methods are static, semi-dynamic or dynamic routing which are implemented inter alia by protocols like RIP (Routing Information Protocol), OSPF (Open Shortest Path First) or EIGRP (Enhanced Interior Gateway Routing Protocol) for IP networks or IS-IS routing in conformance with ISO 10589 for OSI networks.

Under these protocols, the data packets are usually transmitted from the transmitter to the receiver via the shortest or most effective path. Alternative paths are calculated/determined and used only if there is a fault.

In order to achieve greater fault tolerance in the transmission of data packets, multipath routing is used. Here, successive packets or groups of packets, so-called flows, are transmitted via different or multiple paths from the transmitter to the receiver in accordance with a defined traffic distribution which is determined by respectively assigned traffic distribution weightings.

The traffic distribution weightings stipulate the traffic load per path for a destination address. The traffic distribution weighting is normally a value between 0 and 1, where 0 stands for no traffic and 1 stands for maximum traffic on a link or a path. A traffic distribution weighting of 1 means that all packets are transmitted via this path. In the case of multipath routing, in which multiple paths are available, the traffic is divided using the weightings. The sum of the traffic distribution weightings to a destination in a node therefore totals 1, i.e. 100% of the traffic. Other systems of values can also be used for traffic distribution, for example percentages between 0% and 100%.

An example should make this clear. If a network node or a router has for example three paths to a destination, then the traffic can be divided evenly between all three paths. Each path would then be given a traffic distribution weighting of approximately 0.33. A third of all packets or flows would thus be transmitted via each path. Other distributions are also possible, for example 0.5 for the first, 0.3 for the second and 0.2 for the third path. With this distribution, 50% of packets are transmitted via the first path, i.e. every other packet is routed via this path, 30% of the packets are transmitted via the second path and 20% of the packets via the third path. The distribution can be specified according to the traffic flow desired, capacity utilization of the links, distances per link, number of nodes to the destination or other criteria.

Multipath routing means that more than one path and consequently at least one alternative path to the destination is available in the network nodes, so that a rapid local response to link failures is possible. To this end, it must be ensured that a) more than one path to the destination is actually available and b) the linking of multiple paths between the network nodes and across multiple network nodes does not result in loops. Routing loops lead to packets circulating in the network. Circulating packets increase the load on the links and network nodes in the data network and thereby reduce the transport capacity of the network and lead to considerable unnecessary packet delays or to packet losses.

Conditions a) and b) are opposing insofar as the avoidance of routing loops frequently leads to a reduction in the possible and usable multipath routes or paths toward a destination.

This will be illustrated by an example. FIG. 1 shows an arrangement of a part of a packet-switching data network, for example an Internet Protocol (IP) network, consisting of three network nodes R1, R2, R3, such as routers, switches, gateways or other switching devices of the same type which are connected to one another via links L12, L13, L32. The network nodes R1 and R3 have links to a part of the data network that is not shown, via which links they receive data packets. These data packets are determined for a destination D or for an associated destination node that is connected to the network node R2 and can be reached only via this network node.

Data packets received from the network node R1 for the destination D are transmitted via the link L12 to the network node R2 and forwarded to the destination D. Likewise, data packets received from the network node R3 for the destination D are transmitted via the link L32 to the network node R2 and forwarded to the destination D.

An examination is made below of packets that are sent via the network node or router R1 and the link L12 to the network node or router R2 in order to be forwarded from the network node R2 to their destination D. It is immaterial here whether, apart from the path via the network node R1, other paths also existed for these packets through the network under consideration. At the moment when a packet has arrived at the network node R1 and is to be forwarded to the network node R2, the following problem occurs: in the case of normal, shortest-path routing, as it is called, the network node R1 would always forward packets to the network node R2 via the link L12 and the network node R3 would always forward packets to network node R2 via the link L32. The routing tables with regard to the forwarding of packets which carry the destination address D would therefore be:

In node R1:

| Destination | Next node |
| --- | --- |
| D | R2 |

In node R3:

| Destination | Next node |
|---|---|
| D | R2 |

In order to enable the respective node to make a rapid local response to link failures, the following alternative paths would be available in the case of multipath routing: the network node R1 could also route packets to the network node R2 initially via the link L13 to the network node R3 if they are forwarded from there via the link L32 to the network node R2. Similarly, the network node R3 could route packets to the network node R2 via the link L13 to the network node R1 if they are forwarded from there via the link L12 to the network node R2. The routing tables, including the traffic distribution weightings $p_1$ and $p_3$, for the alternative paths would then be:

In node R1:

| Destination | Next node | Weighting |
|---|---|---|
| D | R2 | $1 - p_1$ |
| D | R3 | $p_1$ |

In node R3:

| Destination | Next node | Weighting |
|---|---|---|
| D | R2 | $1 - p_3$ |
| D | R1 | $p_3$ |

If these routing tables were used for purely destination-based routing decision-making, then with the probability $p_1 p_3$ the case would present itself where, for example, a packet from the network node R1 on the path to network node R2 would first be routed via the link L13 to the network node R3 and then again from the network node R3 via the link L13 to the network node R1. With the probability $(p_1 p_3)^2$ this would happen to a packet twice in succession. The probability for a packet to be sent to and fro n times would be $(p_1 p_3)^n$. Consequently, the routing of packets from network node R1 to network node R2 would not be achieved looplessly.

In the case of the two currently available multipath routing mechanisms (Equal Cost Multipath, ECMP for short, under the OSPF protocol and Unequal Cost Multipath Routing, UCMR for short, under the EIGRP protocol from CISCO), the choice of alternative paths to a destination is severely restricted by the fact that loops always have to be avoided, despite the routing of packets being purely destination-based. With the ECMP or UCMR mechanisms, the alternative paths in the example shown in FIG. 1 from network node R1 to network node R2 via network node R3 and from network node R3 to network node R2 via network node R1 are not permitted and/or the link L13 must not be used.

A method which enables the use of alternative paths in the case described above is Multiprotocol Label Switching, MPLS for short. With this protocol, however, conditions have to be maintained network-wide which define the paths or routes on which packets are to be routed through the network by bypassing the IP routing. Here, the network nodes no longer route packets using the destination IP addresses, but a bit sequence, referred to as a label, is placed in front of each packet on entry to the network, said label then being evaluated in each network node. The relationship between label and paths must be established when the network is set up. Each packet has to be provided with a label on entry to the network and the label has to be removed again on exit from the network. Apart from this, additional mechanisms are needed locally in order to reroute packets to an alternative path if the originally intended path fails.

The object of the invention consists then in improving a method and an arrangement for the routing, in particular the multipath routing, of data packets in a packet-switching data network in a manner such that, where required, alternative paths that largely avoid loops are used for the transmission.

This object is achieved by the claims.

The invention provides, in cases like the example described in FIG. 1, for the distribution of traffic to be disregarded and instead for the network nodes to be given locally executable rules. The traffic distribution weighting for the critical alternative paths, i.e. the potential loops, is set to the minimum value, i.e. to zero. The paths are, however, held in the routing table and designated "Joker Links". Furthermore, the nodes now use the rule that they use the links carrying the minimum traffic distribution weighting only when the desired adjacent router or next hop can no longer be reached by any other path that has a positive weighting. This simple extension of the principle of the purely destination-based multipath routing of packets eliminates the problem of circulating packets, provided only one link fails.

The advantage of the method is that particularly in the case of multipath routing an alternative path can be made available, whereby no packets circulate in the network. The method operates regardless of the originating address of packets and without network-wide status information.

Advantageous further developments of the methods are specified in the dependent claims.

For example, the traffic distribution weighting for the alternative path(s) is increased in the event of failure of the primary link, so that the alternative path is now the new principal route. At the same time, at least one new alternative path is determined, if possible, which is then given the minimum traffic distribution weighting (zero). This has the advantage that the routing tables in the network nodes do not become too large.

BRIEF DESCRIPTION OF THE DRAWINGS

Exemplary embodiments of the invention are described below and are shown in the drawings, in which.

DETAILED DESCRIPTION OF THE INVENTION

Figure 1:
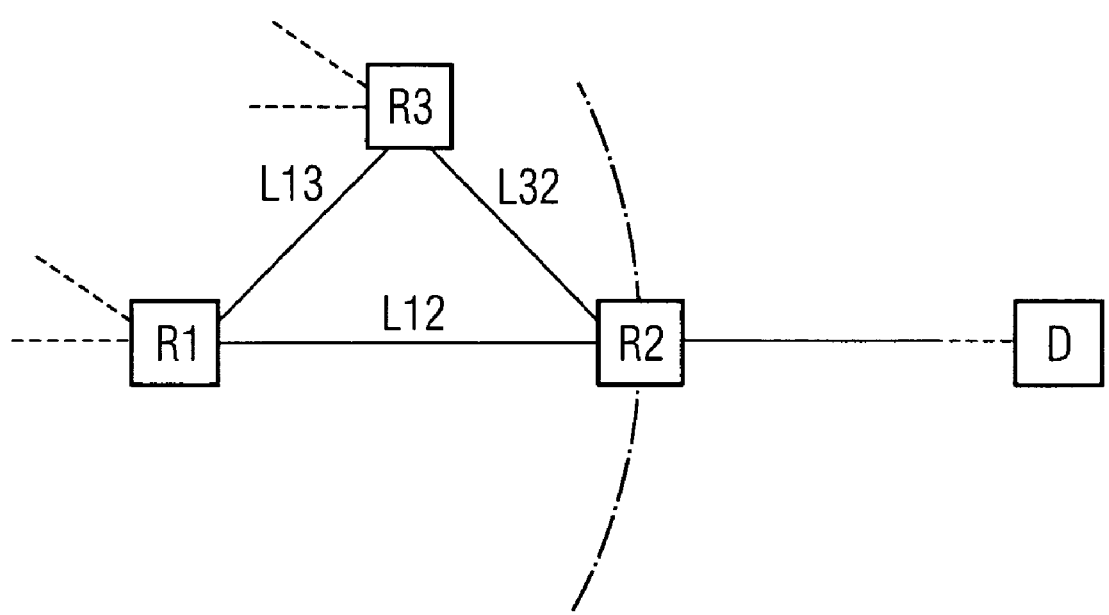
FIG. 1 shows a first arrangement for implementing the method according to the invention.

FIG. 1 shows the arrangement, already described in the introduction, of a part of a packet-switching data network.

Based on the procedures described there, for the method according to the invention the following entries then emerge for the destination D in the routing tables of network nodes R1 and R3:

In node R1:

| Destination | Next node | Weighting |
|---|---|---|
| D | R2 | 1 |
| D | R3 | 0 |

In node R3:

| Destination | Next node | Weighting |
|---|---|---|
| D | R2 | 1 |
| D | R1 | 0 |

A packet which arrives at the network node R1 for routing to the destination D is normally always forwarded via the link L12 directly to the network node R2. Only if the network node R1 ascertains that the link L12 has failed will, for example, the distribution weighting be changed locally, and further packets to the destination D will be forwarded to the network node R3. Accordingly, the entries in the routing table of the network node R1 would then be:

In node R1:

| Destination | Next node | Weighting |
|---|---|---|
| D | R3 | 1 |

The network node R3 in turn routes the packets only directly via the link L32 to the network node R2 since in accordance with the same rule it uses only that entry for the destination D in its routing table which carries a positive weighting.

In this example, packets for the destination D can be sent to and fro between network node R1 and network node R3 only if the network node R2 fails or both links L12 and L32 fail. In this case, however, the destination D is no longer accessible from the network.

Figure 2:
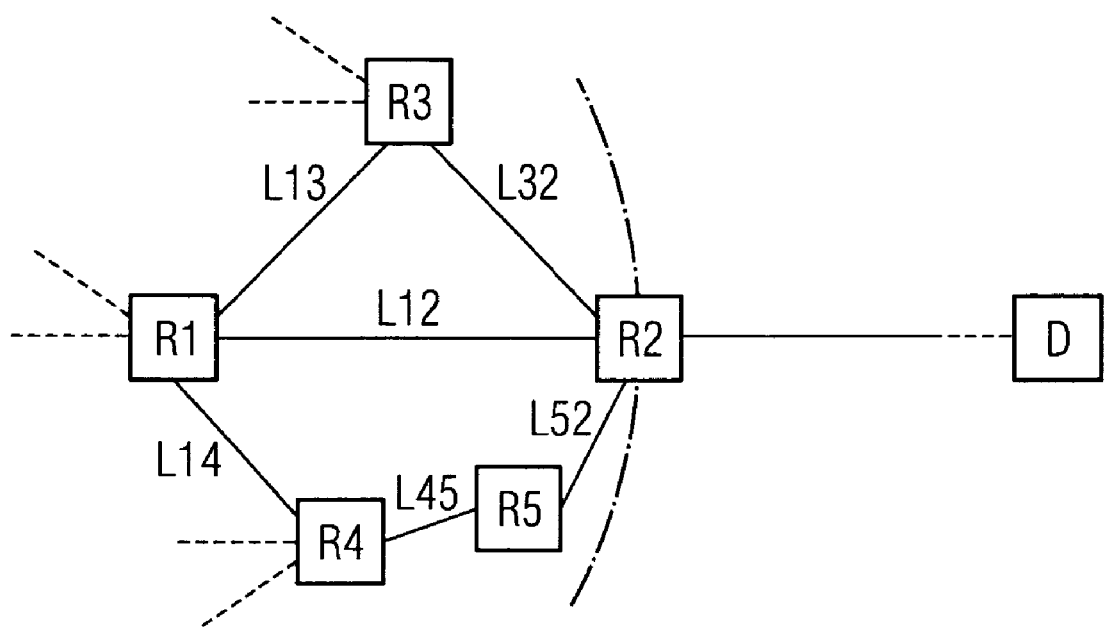
FIG. 2 shows a second arrangement for implementing the method according to the invention.

FIG. 2 shows an arrangement as per FIG. 1 with the proviso that two further series-connected network nodes or routers R4 and R5 enable a path from network node R1 to network node R2, namely starting from network node R1 via the link L14 to the network node R4, from this node via the link L45 to the network node R5 and from this node in turn via the link L52 to the network node R2.

The routing table in the network node R4 contains for the destination D an entry relating to the network node R5 and this node correspondingly contains an entry relating to the network node R2:

In node R4:

| Destination | Next node | Weighting |
|---|---|---|
| D | R5 | 1 |

In node R5:

| Destination | Next node | Weighting |
|---|---|---|
| D | R2 | 1 |

The path via network node R4 and network node R5 could be determined or calculated as an alternative path in accordance with the switching or rerouting procedure in the network node R1 where the link L12 has already failed. The entries in the routing table of the network node R1 would accordingly then be:

In node R1:

| Destination | Next node | Weighting |
|---|---|---|
| D | R3 | 1 |
| D | R4 | 0 |

Analogously, a packet would, in the event that the link L13 between network node R1 and network node R3 fails, then be routed from network node R1 via link L14 to the network node R4 and from there via link L45, network node R5 and link L52 to the network node R2 where it is in turn transmitted to the destination D.

Figure 3:
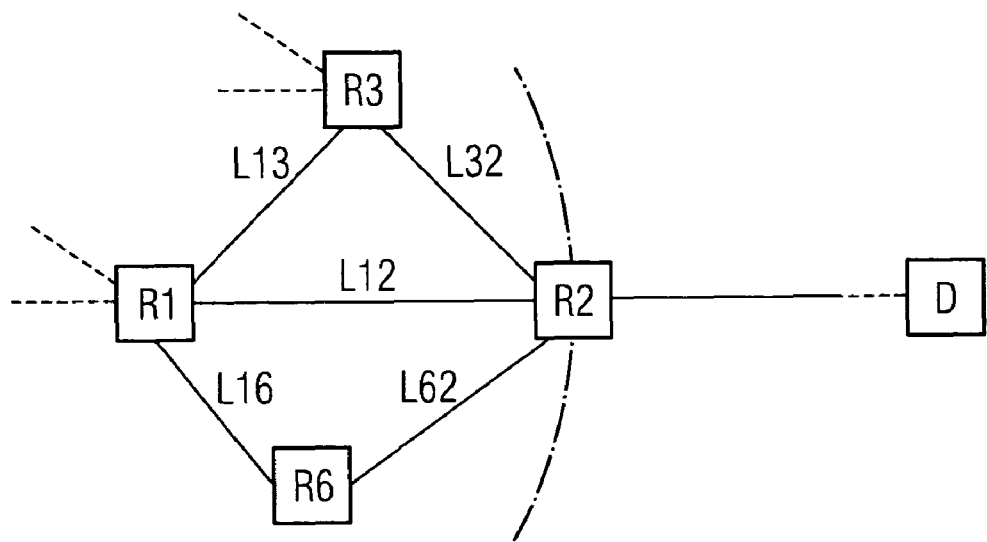
FIG. 3 shows a third arrangement for implementing the method according to the invention.

FIG. 3 shows an arrangement as per FIG. 1 subject to the proviso that from network node R1 a link L16 runs to a network node R6 and from this network node a link L62 runs to network node R2.

The routing table in the network node R6 corresponds by analogy to that in network node R3 and is not shown here.

In this example, the link L12 is the primary link, which is backed up by two alternative paths, via network node R3 and network node R6 respectively. Both alternative paths are entered in the routing table of the network node R1:

In node R1:

| Destination | Next node | Weighting |
|---|---|---|
| D | R2 | 1 |
| D | R3 | 0 |
| D | R6 | 0 |

If the link L12 fails, the packets are transmitted via one of the two network nodes R3 and R6 or optionally, for example alternately, via both network nodes or alternative paths. In addition, a further alternative path could, if available, be calculated, in an analogous manner to the example in FIG. 2. Similarly, the traffic distribution weightings can be reassigned, for example to:

Node R1:

| Destination | Next node | Weighting |
|---|---|---|
| D | R3 | 0.5 |
| D | R6 | 0.5 | for the use of both alternative paths, or:

Node R1:

| Destination | Next node | Weighting |
| --- | --- | --- |
| D | R3 | 1 |
| D | R6 | 0 | for the use of a single alternative path, namely that via the network node R3.

Figure 4:
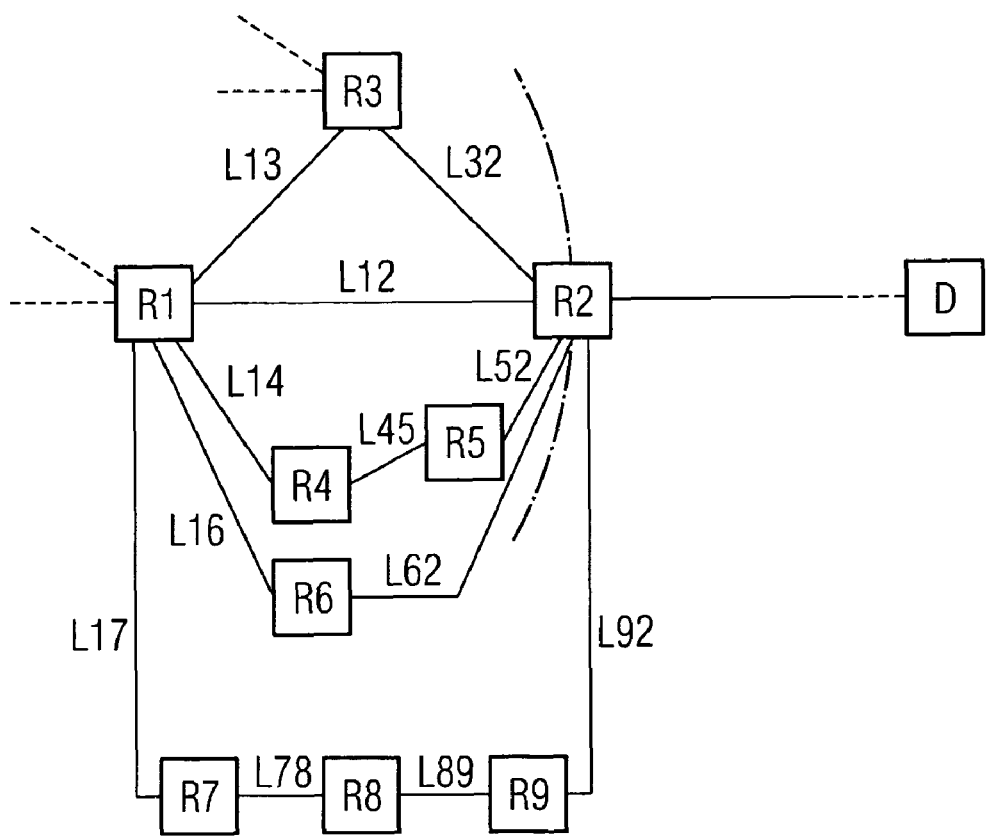
FIG. 4 shows a fourth arrangement for implementing the method according to the invention.

FIG. 4 shows an arrangement as per FIG. 2 and FIG. 3, subject to the proviso that as well as network nodes R4, R5 and R6 and associated links as per FIG. 2 and FIG. 3, there are provided three further network nodes R7, R8, R9, connected in series between network node R1 and network node R2, said further network nodes having associated links L17, L78, L89 and L92.

The routing tables in these network nodes correspond in an analogous manner to those described previously.

In this case, the traffic to destination D is divided in network node R1 over multiple routes (multipath routing), in accordance with the following routing table in network node R1:

Node R1:

| Destination | Next node | Weighting |
| --- | --- | --- |
| D | R2 | 0.5 |
| D | R3 | 0.3 |
| D | R6 | 0.2 |
| D | R4 | 0 |

The link to network node R4 here is the alternative path or "joker link" in accordance with the preceding examples. This link is used only after all preceding links, in the example to network node R2, network node R3 and network node R6, have failed. The traffic distribution weightings could then be adjusted correspondingly, for example to:

Node R1:

| Destination | Next node | Weighting |
| --- | --- | --- |
| D | R3 | 0.6 |
| D | R6 | 0.4 |
| D | R4 | 0 |

In the event of further links failing:

Node R1:

| Destination | Next node | Weighting |
| --- | --- | --- |
| D | R3 | 1 |
| D | R4 | 0 |

Meanwhile, or after the last primary link has failed, an alternative path, for example via the network nodes R7, R8, R9, can be calculated or determined, as per the example in FIG. 2:

Node R1:

| Destination | Next node | Weighting |
| --- | --- | --- |
| D | R4 | 1 |
| D | R7 | 0 |

Equally, the alternative path via network node R7 could be entered in the routing table from the outset, as per the example for FIG. 3:

Node R1:

| Destination | Next node | Weighting |
| --- | --- | --- |
| D | R2 | 0.5 |
| D | R3 | 0.3 |
| D | R6 | 0.2 |
| D | R4 | 0 |
| D | R7 | 0 |

If one or all primary links fail, all or individual alternative paths can be used, for example in accordance with the following routing table:

Node R1:

| Destination | Next node | Weighting |
| --- | --- | --- |
| D | R3 | 0.6 |
| D | R6 | 0.2 |
| D | R4 | 0 |
| D | R7 | 0.2 | or:

Node R1:

| Destination | Next node | Weighting |
| --- | --- | --- |
| D | R3 | 0.6 |
| D | R6 | 0.2 |
| D | R4 | 0.1 |
| D | R7 | 0.2 | or:

Node R1:

| Destination | Next node | Weighting |
| --- | --- | --- |
| D | R4 | 0.5 |
| D | R7 | 0.5 |

All possible combinations would be conceivable here.

In the exemplary embodiments, the network nodes can have links to further parts of the data network that are not shown.

Equally, regenerators or other network elements can be inserted in the links between the network nodes.

As a packet-switching data network, an Internet Protocol network, IP network for short, is particularly suitable for the method described, specifically for the failsafe transmission of voice over IP networks, VoIP for short.

The method according to the invention is intended primarily for multipath routing in IP networks. It can also be employed for other routing methods such as Shortest Path or similar.

Figure 5:
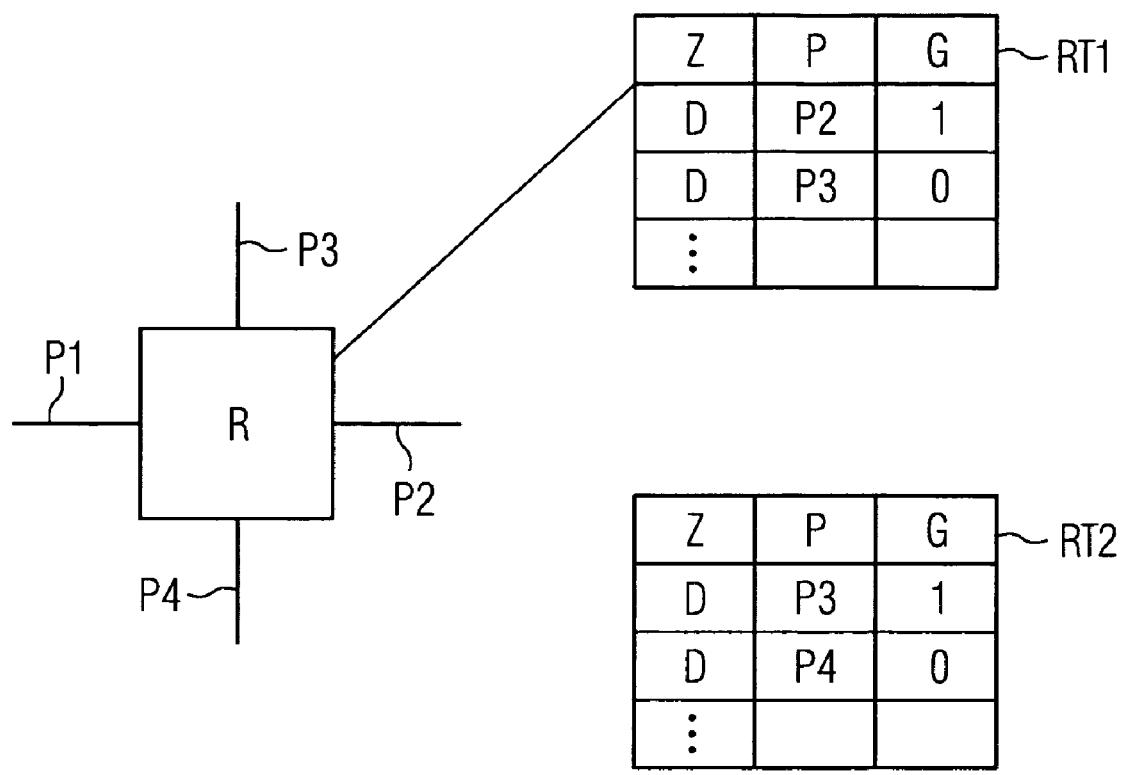
FIG. 5 shows an arrangement of a network node according to the invention.

FIG. 5 shows a schematic arrangement of a network node R according to the invention. This node has four bi-directional access points or ports P1 to P4. The network node R receives data packets via these access points from a packet-switching data network (not shown here), similar to a network as per FIGS. 1 to 4, which data packets it must route, switch onward or transmit to the destination. The network node R contains a routing table RT, the content of which is represented in two different states as routing table RT1 and routing table RT2. The routing table RT has three columns. The column Z contains an entry for a destination or for a destination node, in the example the destination D. The column P contains an entry about the next node or the corresponding access point or port, via which the destination can be reached. In the example, the ports P2 and P3 are entered as exit points to the destination D. The column G contains the traffic distribution weighting provided for the route.

The network node functions for example in accordance with the following mode of operation. A data packet contains a destination address. If a data packet arrives in the network node or router, the destination address is determined from the data packet. The destination address determined is compared with the destination address entries in the routing table. From the routing table, the appropriate exit point or next node is determined at which or via which the packet is emitted. For example, according to routing table RT1 a data packet for the destination D is transmitted onward via the access point or port P2.

The destination D can be reached in the first routing table RT1 via the access points P2 and P3. According to the invention, the first or primary path, which in this case leads via port 2, is assigned the maximum traffic distribution weighting, e.g. 1 or 100%. As an alternative path, the second or secondary path is given the minimum traffic distribution weighting, e.g. 0 or 0%, i.e. it is held in the routing table but no data packets or traffic are emitted via this route.

Traffic can also be distributed differently via any other existing access points or ports, by analogy with the examples for FIGS. 1 to 4.

If in the example the first path via access P2 fails, the second path via access P3 is used, i.e. data packets which were previously sent to the destination D via P2 are now sent to the destination D via P3. This can be done for example by removing the entry for access point P2 from the routing table RT and giving the second path via access point P3 the maximum traffic distribution weighting, as shown in routing table RT2. The detection of a failure of a link or of a path and the deletion of the corresponding entries in the routing table, as well as the rerouting of the data packets to a different access point or port can be effected by means of prior-art mechanisms known to a person skilled in the art. In addition, through known mechanisms an alternative path, in this case via access point P4, can be determined, said path being entered in the routing table with a minimum traffic distribution weighting, in accordance with the lower entry in routing table RT2.

The routing table RT can contain further entries to the same or other destinations.

As a further embodiment, a network node can always apply the rule that it will not return packets on the same link on which it has received them. This rule can also be used node-specifically rather than link-specifically: a network node does not send packets back to the same network node from which it has received them.

Traffic distribution weightings can also be set to zero for other reasons than for avoiding loops in normal operations, i.e. other than in the case of link failure. It may, for example, be appropriate to restrict the distribution of traffic to short paths so that no network capacity is wasted by routing packets on circuitous paths.

Except after a locally-detected link failure, the distribution weighting for a link or path can be changed or set at a high level of or the main route(s) can be changed, even after the reporting of a link failure at a different point, by a different protocol. This could be e.g. a report from an adjacent node indicating that it no longer has a direct path for a given destination. Individual or all network nodes can then carry out a recalculation of their paths to defined or to all destinations.

A modification of the method could be that links or paths are used as soon as certain other routes that are responsible for potential loops are no longer available. The routing table can then contain further entries indicating which links must have failed, in order for the traffic distribution weighting for a link to be set to a value greater than zero. In addition, the table could in such a case also contain the traffic distribution weighting then to be used.

The method described can be used in the same manner and implemented simply if there are more than two network nodes before the last network node available for selection. It is also useful to use the method in this case, as the underlying loop problem also applies here, even if it is not so obvious.

The method described can be used in the same manner at other points in the network where the problem arises that, because of the need for loopless conditions, traffic cannot be distributed between multiple paths.

The method is not restricted to distributed control in each network node. A central network management can be provided which distributes respectively updated routing tables or routing information to each network node. This can also be applied or used in the event of a disruption, i.e. where links or transmission paths fail. The method can be used independently of centralized or locally distributed network management or routing management.

In conclusion, it can be stated that the setting of distribution weightings to zero in routing tables enables a rapid local response to faults and simultaneously prevents circulating packets.

The decision-making rule used locally in the network nodes—setting of the traffic distribution weighting at a high level where a link fails or in the event of corresponding fault conditions—enables a rapid response without alternative paths having to be configured in advance or any communication between network nodes being necessary.

The invention claimed is:

1. A method for routing data packets in a packet switching data network having network nodes, wherein in the data network:
   data packets are transmitted from a transmitter to a receiver;
   the data packets have destination addresses;
   the data packets are routed by the network nodes according to the destination addresses;
   more than one path and consequently at least one alternative path to a destination is available in at least one network node;
   successive packets or groups of packets are transmitted via different or multiple paths from the transmitter to the receiver in accordance with a defined traffic distribution which is determined by respectively assigned traffic distribution weightings;

the method comprising:

assigning a first and a second transmission path to a destination address;

including the first and the second transmission paths in a routing table of at least one network node of the data network, wherein the first and the second transmission paths have assigned traffic distribution weightings indicating a portion of the traffic load allocated to each transmission path;

assigning a maximum traffic distribution weighting to the first transmission path;

assigning a minimum traffic distribution weighting to the second transmission path;

as long as the first transmission path and the second transmission path are both available, routing the data packets via the first transmission path; and using links carrying the minimum traffic distribution weighting for the transmission of data packets only when a desired adjacent router or next hop towards the destination can no longer be reached by any other path.

2. The method according to claim 1, which comprises: in an event of a failure of the first transmission path, assigning the maximum traffic distribution weighting to the second transmission path.

3. The method according to claim 1, which comprises: in an event of a failure of the first transmission path, calculating a third transmission path that is given the minimum traffic distribution weighting.

4. The method according to claim 1, which comprises: controlling a particular network node such that a transmission path on which the particular network node receives a data packet is blocked for a return transmission of the same data packet.

5. A method for routing data packets in a packet switching data network having network nodes, wherein in the data network:

data packets are transmitted from a transmitter to a receiver;

the data packets have destination addresses;

the data packets are routed by the network nodes according to the destination addresses;

more than one path and consequently at least one alternative path to a destination is available in at least one network node;

successive packets or groups of packets are transmitted via different or multiple paths from the transmitter to the receiver in accordance with a defined traffic distribution which is determined by respectively assigned traffic distribution weightings;

the method comprising:

assigning a first transmission path, at least one second transmission path, and a last transmission path to a destination address;

including the first transmission path, the at least one second transmission path, and the last transmission path in a routing table of at least one network node of the data network, wherein the first transmission path, the at least one second transmission path, and the last transmission path have assigned traffic distribution weightings indicating a portion of a traffic load allocated to each transmission path;

assigning a maximum traffic distribution weighting to the first transmission path;

assigning a minimum traffic distribution weighting to the at least one second transmission path and to the last transmission path;

as long as the first transmission path is available, routing the data packets via the first transmission path; and using a plurality of links carrying the minimum traffic distribution weighting for transmitting data packets only when a desired adjacent router or next hop towards the destination can no longer be reached by any other path.

6. The method according to claim 5, which comprises: in an event of a failure of the first transmission path, giving at least one other transmission path a traffic distribution weighting that deviates from the minimum traffic distribution weighting.

7. The method according to claim 5, which comprises: in an event of a failure of the first transmission path, calculating at least one additional transmission path that is given the minimum traffic distribution weighting.

8. The method according to claim 5, which comprises: controlling a particular network node such that a transmission path on which the particular network node receives a data packet is blocked for a return transmission of the same data packet.

9. A method for routing data packets in a packet switching data network having network nodes, wherein in the data network:

data packets are transmitted from a transmitter to a receiver;

the data packets have destination addresses;

the data packets are routed by the network nodes according to the destination addresses;

more than one path and consequently at least one alternative path to a destination is available in at least one network node;

successive packets or groups of packets are transmitted via different or multiple paths from the transmitter to the receiver in accordance with a defined traffic distribution which is determined by respectively assigned traffic distribution weightings;

the method comprising:

assigning a first transmission path, at least one second transmission path, and a last transmission path to a destination address;

including the first transmission path, the at least one second transmission path, and the last transmission path in a routing table of at least one network node of the data network, wherein the first transmission path, the at least one second transmission path, and the last transmission path have assigned traffic distribution weightings indicating a portion of the traffic load allocated to each transmission path;

assigning a minimum traffic distribution weighting to the last transmission path;

distributing traffic on the network using assigned traffic distribution weightings; and using the last transmission path for transmitting data packets only in an event of a failure of at least a part of both the first transmission path and the at least one second transmission path or when a desired adjacent router or next hop towards the destination can no longer be reached by any other path.

10. The method according to claim 9, wherein in an event of failure of at least a part of the transmission paths with values that deviate from the minimum traffic distribution weighting, the at least one transmission path with a minimum traffic distribution weighting is given a traffic distribution weighting that deviates from said minimum weighting.

11. The method according to claim 9, wherein in an event of failure of at least a part of the transmission paths with values that deviate from the minimum traffic distribution weighting, at least one further transmission path is calculated that is given the minimum traffic distribution weighting.

12. The method according to claim 9, which comprises controlling a particular network node such that a transmission path on which the particular network node receives a data packet is blocked for a return transmission of the same data packet.

13. The method according to claim 9, which comprises applying a multipath routing method in the packet-switching data network.

14. The method according to claim 9, which comprises using a network operated in conformance with an Internet Protocol as the packet-switching data network.

15. The method according to claim 9, which comprises communicating at least a failure of the first transmission path of a network node to at least one further network node.

16. The method according to claim 15, which comprises using a protocol to perform a transmission.

17. The method according to claim 15, which comprises recalculating at least one transmission path of at least one destination address in at least one further network node.

18. The method according to claim 9, which comprises:
assigning at least one further traffic distribution weighting to the transmission paths with a minimum traffic distribution weighting entered in a routing table; and
using the further traffic distribution weighting if a transmission path is interrupted.

19. The method according to claim 18, which comprises assigning a transmission path to a further traffic distribution weighting entered in the routing table and using the traffic distribution weighting in an event of a failure of an assigned transmission path.

20. A network node for a packet switching data network comprising:
a processing unit;
a computer readable/writeable storage medium associated with the processing unit and arranged to store routing table information including destination addresses associated with related transmission path information including path availability and traffic distribution weightings; and
a packet forwarding engine capable of extracting from the storage medium, based on a destination address read from a data packet to be forwarded, related routing table information and capable of distributing data packets destined for a certain destination to different transmission paths in a way to create a traffic load distribution corresponding with the traffic distribution weightings read from the storage medium and to route data packets to links carrying the minimum traffic distribution weighting in case no other transmission path towards the destination is available;
the processing unit including an associated program memory capable of storing a program, which when executed by the processing unit updates and/or modifies a content of the storage medium according to route and path availability information retrieved and/or received from the network.

* * * * *